(12) United States Patent
Yoshida et al.

(10) Patent No.: US 10,518,818 B2
(45) Date of Patent: Dec. 31, 2019

(54) VEHICLE BODY STRUCTURE OF VEHICLE

(71) Applicant: MAZDA MOTOR CORPORATION, Hiroshima (JP)

(72) Inventors: Tomoya Yoshida, Hiroshima (JP); Ryuji Nonaka, Hiroshima (JP); Hiroyuki Nagatomo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/106,629

(22) Filed: Aug. 21, 2018

(65) Prior Publication Data

US 2019/0061833 A1 Feb. 28, 2019

(30) Foreign Application Priority Data

Aug. 24, 2017 (JP) .................. 2017-161616

(51) Int. Cl.

| B62D 27/02 | (2006.01) |
| B23K 11/11 | (2006.01) |
| B62D 25/20 | (2006.01) |
| B23K 101/00 | (2006.01) |

(52) U.S. Cl.
CPC ............ *B62D 27/023* (2013.01); *B23K 11/11* (2013.01); *B62D 25/2018* (2013.01); *B62D 25/2027* (2013.01); *B62D 25/2036* (2013.01); *B23K 2101/006* (2018.08)

(58) Field of Classification Search
CPC .............. B62D 27/023; B62D 25/2018; B62D 25/2027; B62D 25/2036; B62D 27/026; B23K 11/11; B23K 2101/006; B23K 11/115
USPC ........................................................ 296/204
See application file for complete search history.

(56) References Cited

U.S. PATENT DOCUMENTS

| 4,826,238 A * | 5/1989 | Misono ................ B62D 25/025 296/205 |
| 6,817,654 B2 * | 11/2004 | Kitagawa ............... B62D 21/15 296/187.03 |
| 2010/0098969 A1 * | 4/2010 | Hashimura ........... B21J 15/025 428/653 |
| 2017/0305469 A1 | 10/2017 | Iyoshi et al. |

FOREIGN PATENT DOCUMENTS

| JP | 2008-215367 A | 9/2008 |
| JP | 2014-151657 A | 8/2014 |
| JP | 2016-172528 A | 9/2016 |
| JP | 2017-043137 A | 3/2017 |
| JP | 2017-081189 A | 5/2017 |

* cited by examiner

*Primary Examiner* — Pinel E Romain
(74) *Attorney, Agent, or Firm* — Studebaker & Brackett PC

(57) ABSTRACT

A vehicle body structure of a vehicle includes a joint (20) formed by joining body parts such that the body parts overlap each other. The joint (20) includes a plurality of spot joints (21) and an adhesive joint (22). An adhesive has a storage modulus in the range of 100 MPa to 800 MPa and a loss factor of 0.2 or more at a temperature of 20° C. and an exciting force frequency of 60 Hz.

20 Claims, 7 Drawing Sheets

(comparative example)

(comparative example)

(comparative example)

(comparative example)

VEHICLE BODY STRUCTURE OF VEHICLE

CROSS-REFERENCE TO RELATED APPLICATION

This application claims priority to Japanese Patent Application No. 2017-161616 filed on Aug. 24, 2017, the entire disclosure of which is incorporated by reference herein.

BACKGROUND

The disclosed technique relates to vehicle body structures of vehicles.

Regarding the technique disclosed herein, viscoelastic members having a storage modulus of 500 MPa or less and a loss factor of 0.2 or more at a temperature of 20° C. and an exciting force frequency of 30 Hz are known in the art (Japanese Unexamined Patent Publication No. 2014-151657).

Japanese Unexamined Patent Publication No. 2014-151657 discloses a windshield member, a cowl panel that supports the windshield member, and a reinforcing body (formed by a plurality of strip-shaped reinforcing portions) that reinforces the cowl panel. In order to reduce panel vibration of the windshield member, the windshield member and the cowl panel, the overlapping portions of the reinforcing portions, etc. are joined by adhesion of the viscoelastic member.

SUMMARY

Weld bonding, which uses adhesive bonding and spot welding, can increase rigidity of vehicle bodies. Weld bonding is therefore widely used to join body parts that form vehicle bodies, such as panels and members.

Weld bonding typically uses an adhesive having a high storage modulus in order to increase rigidity of vehicle bodies. Specifically, the storage modulus of an adhesive that is used for weld bonding is at least 1,500 MPa, and is normally in the range of 2,000 MPa to 3,000 MPa. The loss factor of such an adhesive is generally as low as about 0.05.

The use of an adhesive having a high storage modulus typically increases rigidity, but such an adhesive typically has a low loss factor. Conventional adhesives having a high storage modulus therefore do not provide excellent vibration damping characteristics for vibration of vehicle bodies. An adhesive having a higher loss factor provides excellent vibration damping characteristic, but such an adhesive has a lower storage modulus. The use of such an adhesive therefore results in reduced rigidity. It has therefore been a challenge to achieve both high rigidity and excellent vibration damping characteristics in vehicle body structures of vehicles using weld bonding.

It is an object of the disclosed technique to provide a vehicle body structure of a vehicle which has both high rigidity and excellent vibration damping characteristics.

The disclosed technique relates to a vehicle body structure of a vehicle. The vehicle body structure includes a joint formed by joining a body part and another body part such that the body parts overlap each other.

The joint includes a plurality of spot joints located at intervals in a direction in which the joint extends and formed by partially joining the body parts, and an adhesive joint formed by adhesion of an adhesive placed between the body parts to both of the body parts.

The adhesive has a storage modulus in the range of 100 MPa to 800 MPa and a loss factor of 0.2 or more at a temperature of 20° C. and an exciting force frequency of 60 Hz.

This vehicle body structure includes the joint formed by weld bonding, and the adhesive having specific physical properties is used for the joint. The use of the adhesive having such physical properties for weld bonding allows both high rigidity and excellent vibration damping characteristics, which are conventionally considered difficult to achieve in weld-bonded structures, to be achieved in weld-bonded structures. As used herein, a partially bonded structure (spot joint) in weld bonding is not limited to spot welding. The partially bonded structure (spot joint) in weld bonding is a concept including joint structures similar to spot welding.

While researching improvement in vibration damping characteristics of weld-bonded structures, the inventors found that the relation between the storage modulus of an adhesive that is used for weld bonding and the rigidity of weld bonding has unexpected universal characteristics.

It is conventionally considered that the higher the storage modulus is, the higher the rigidity of welding bonding is. However, it is found that, when the storage modulus becomes higher than 100 MPa, the rate of increase in rigidity of weld bonding sharply decreases, and after this sharp decrease in the rate of increase in rigidity, the rigidity does not change so much even if the storage modulus changes significantly.

A similar tendency is seen regardless of whether weld bonding is used for models having a simple structure or for complex vehicle body structures, and it is thus found that the above characteristics are universal.

Based on such universal characteristics, the use of the adhesive having the above specific physical properties for weld bonding allows a significant increase in loss factor while achieving rigidity that is almost the same as conventional rigidity, whereby improved ride quality and reduced noise are easily achieved.

The adhesive may have a storage modulus of higher than 500 MPa and 600 MPa or less and a loss factor of 0.3 or more at a temperature of 20° C. and an exciting force frequency of 60 Hz.

The use of the adhesive having such physical properties for weld bonding allows a significant increase in loss factor while achieving rigidity similar to that obtained by conventionally used adhesives having a storage modulus of over 1,500 MPa. Further improvement in both rigidity and vibration damping characteristics is thus achieved.

The adhesive joint may be continuous in the direction in which the joint extends.

This allows an adhesive force to be uniformly applied to a large area of the joint even if the joint is narrow. Accordingly, even if an external force is locally applied to the joint, the external force is smoothly spread over the entire joint. Rigidity of the vehicle body is thus increased.

The interval between the spot joints may be in the range of 10 mm to 100 mm.

A too short interval between the spot joints increases the influence of joint rigidity and thus interferes with the vibration damping effect of the adhesive joint. A too wide interval between the spot joints reduces the influence of joint rigidity and thus increases a burden on the adhesive joint, whereby the overall rigidity of the joint may be reduced.

However, in the case where the interval between the spot joints is in the above range, the adhesive joint having rigidity and vibration damping characteristics and the spot joints having high rigidity appropriately complement each other, whereby both high rigidity and excellent vibration damping characteristics of the vehicle body are stably achieved.

The joint may include a pair of butt joints located so as to face each other at a predetermined interval, and a closed-section structure may be formed between the pair of butt joints. In this case, the adhesive joint may be formed along an edge of the butt joint which faces toward inside of the closed-section structure.

This restrains opening of the butt joint and progression of deformation when an external force such as a torsional force is applied to the closed-section structure. Structural rigidity is thus also increased.

The joint may include a lap joint formed by joining ends of the body parts. In this case as well, the adhesive joint may be formed along at least one of edges of the lap joint.

This increases structural rigidity as in the case of the closed-section structure.

In these joints, at least one of the two body parts forming the joint may have a thickness of less than 2 mm. The body part having a thickness of less than 2 mm is deflected as appropriate according to the rigidity of the adhesive. The adhesive placed in the joint is therefore subjected to load such as a shear force and is deformed. Vibration damping characteristics are thus improved while achieving reduction in weight of the vehicle body.

The joint may be used to join the body parts that form a passenger compartment of the vehicle. This improves comfort in the vehicle while providing sufficient vehicle body strength.

According to the disclosed vehicle body structure, both high rigidity and excellent vibration damping characteristics are achieved without making the structure complex. Improved ride quality and reduced noise are thus easily achieved while providing required vehicle body strength, whereby improved comfort in vehicles is provided.

BRIEF DESCRIPTION OF THE DRAWINGS

FIG. 5A shows the cross member before application of a torsional force, and FIG. 5B shows the cross member after application of the torsional force.

FIG. 6A shows a cross member before application of a torsional force, and FIG. 6B shows the cross member after application of the torsional force.

FIG. 7A shows the joint before application of a torsional force, and FIG. 7B shows the joint after application of the torsional force.

FIG. 8A shows a joint before application of a torsional force, and FIG. 8B shows the joint after application of the torsional force.

DETAILED DESCRIPTION

An embodiment of the present disclosure will be described in detail with reference to the accompanying drawings. The following description is by way of example only and is not intended to limit the scope, applications, or uses of the invention.

Structure of Vehicle Body

Figure 1A:
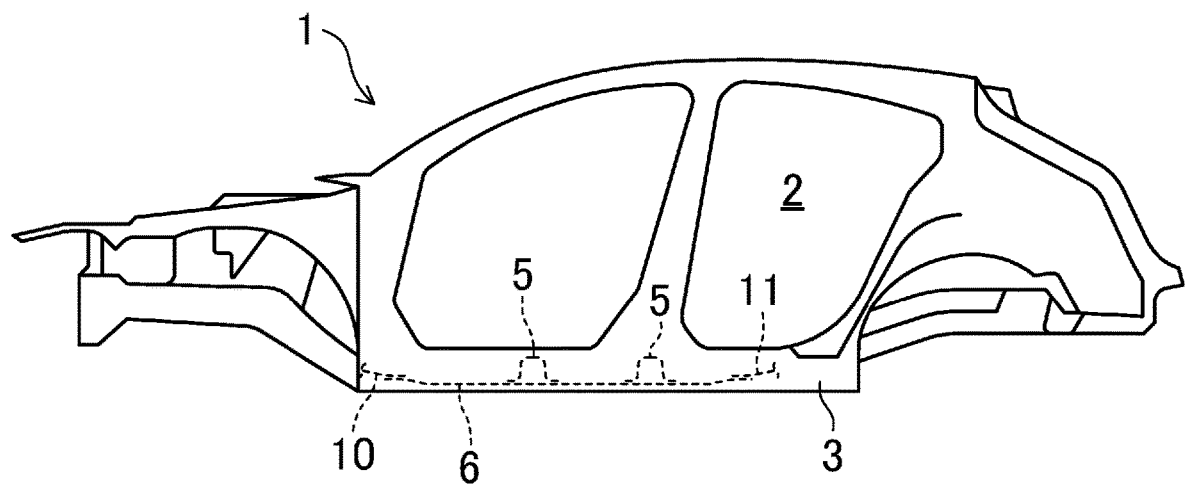
FIG. 1A schematically shows a vehicle body as viewed from the left side.
Figure 1B:
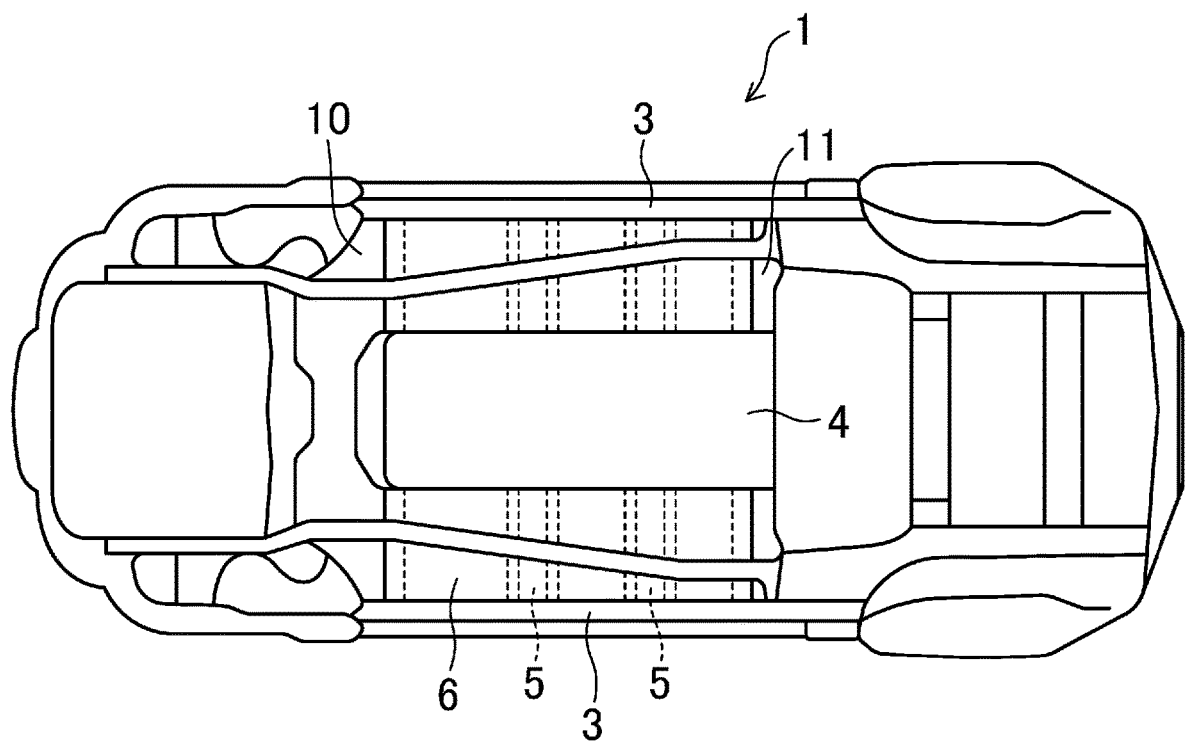
FIG. 1B schematically shows a lower part of the vehicle body as viewed from underneath.

FIGS. 1A and 1B show a vehicle body 1 of an automobile (vehicle) to which the disclosed technique has been applied. FIG. 1A shows the vehicle body 1 as viewed from the left side, and FIG. 1B shows the vehicle body 1 as viewed from underneath.

A front part of the vehicle body 1 mainly forms an engine compartment and a rear part of the vehicle body 1 mainly forms a trunk compartment. An intermediate part in the longitudinal direction of the vehicle body 1 forms a passenger compartment 2 that accommodates an occupant(s). Side sills 3 extending parallel to each other in the longitudinal direction are disposed on the right and left sides of an intermediate portion of a lower part of the vehicle body 1. A tunnel reinforcement 4 is disposed in a middle part in the lateral direction of the vehicle between the side sills 3 so as to extend in the longitudinal direction.

A plurality of cross members 5 extending in the lateral direction of the vehicle are joined to the right and left side sills 3 so as to cross the tunnel reinforcement 4. A floor panel 6 is disposed in the intermediate portion of the lower part of the vehicle body 1 so as to cover the floor of the passenger compartment 2. A vehicle body structure that supports a lower part of the passenger compartment 2 is formed by joining the floor panel 6, the side sills 3, the tunnel reinforcement 4, and the cross members 5 together.

A front end of the floor panel 6 is joined to a front panel member 10 located on the front side of the passenger compartment 2. A rear end of the floor panel 6 is joined to a rear panel member 11 located on the rear side of the passenger compartment 2. Weld bonding, which uses adhesive bonding and spot welding, is used to join the floor panel 6 and the front panel member 10 and to join the floor panel 6 and the rear panel member 11 because high rigidity is required for such joining.

Figure 2:
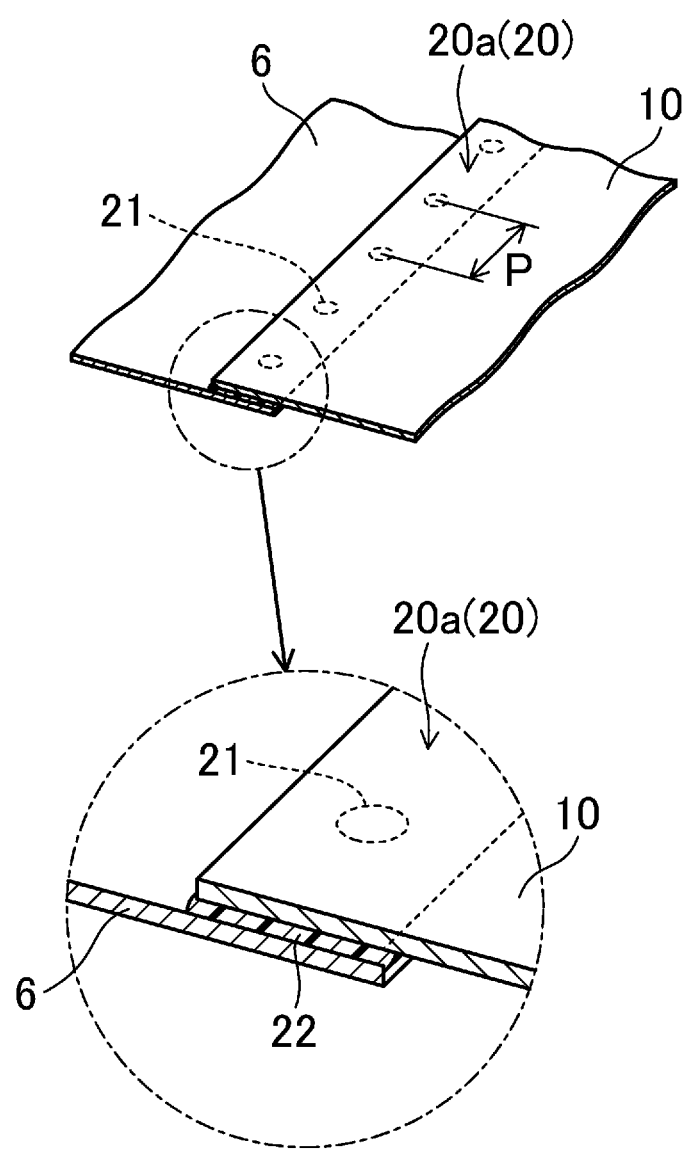
FIG. 2 schematically shows a joint.

FIG. 2 shows a joint 20 between the floor panel 6 and the front panel member 10 which have been joined by weld bonding. The joint 20 (lap joint 20a) is formed by placing a rear end of the front panel member 10, which extends in the lateral direction of the vehicle, on top of the front end of the floor panel 6, which extends in the lateral direction of the vehicle, with a predetermined overlapping width and joining the strip-shaped overlapping portions extending in the lateral direction of the vehicle.

The lap joint 20a has spot joints 21 at a plurality of positions located at predetermined intervals in the direction in which the lap joint 20a extends. The spot joints 21 are formed by welding the front end of the floor panel 6 and the rear end of the front panel member 10 in spots (what is called spot welding; an example of the "spot joints"). An adhesive is present between the joint surface of the front end of the floor panel 6 and the joint surface of the rear end of the front panel member 10 which form the lap joint 20a. An adhesive joint 22 is formed by the adhesive adhering to both joint surfaces of the floor panel 6 and the front panel member 10.

Since a joint 20 between the floor panel 6 and the rear panel member 11 has the same structure as the joint 20 between the floor panel 6 and the front panel member 10, description thereof will be omitted.

Figure 3:
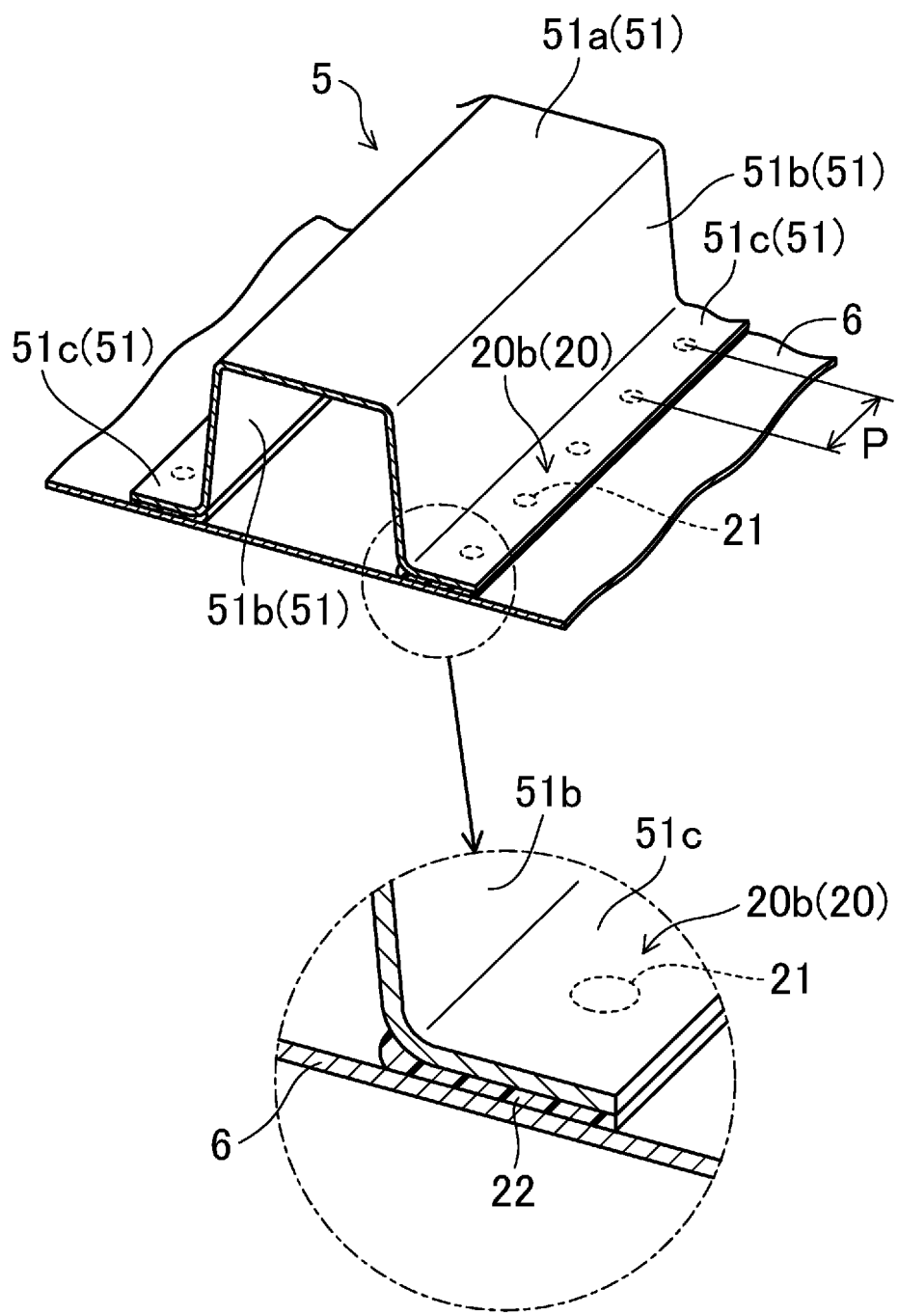
FIG. 3 schematically shows another joint.

High rigidity is required also for the cross members 5. Weld bonding is therefore used for joining of the cross members 5. As shown in FIG. 3, each cross member 5 is formed by joining a member 51 having a hat-shaped or U-shaped section to the floor panel 6. The member 51 has a strip-shaped main wall portion 51*a*, a pair of sidewall portions 51*b*, and a pair of flange portions 51*c*. The sidewall portions 51*b* are continuous with both side edges of the main wall portion 51*a* along the entire length of the main wall portion 51*a* and face each other. The flange portions 51*c* extend in opposite directions from the lower ends of the sidewall portions 51*b* along the entire length of the sidewall portions 51*b*.

The flange portions 51*c* are joined to the floor panel 6 by weld bonding (butt joints 20*b*). A closed-section structure is thus formed between the butt joints 20*b* extending parallel to each other at an interval. This increases structural rigidity of the vehicle body 1.

Like the lap joint 20*a*, each butt joint 20*b* has spot joints 21 at a plurality of positions located at predetermined intervals in the direction in which the butt joint 20*b* extends. The spot joints 21 are formed by welding the flange portion 51*c* and the floor panel 6 in spots. An adhesive is present between the joint surface of the flange portion 51*c* and the joint surface of the floor panel 6 which form the butt joint 20*b*. An adhesive joint 22 is formed by the adhesive adhering to both joint surfaces of the flange portion 51*c* and the floor panel 6.

The side sills 3 and the floor panel 6, the tunnel reinforcement 4 and the floor panel 6, etc. are similarly joined by weld bonding.

Joints

High rigidity is required for the joints 20 that are formed by weld bonding, such as the lap joint 20*a* and the butt joints 20*b*, in order to provide sufficient vehicle body strength. An adhesive having high rigidity, namely having a storage modulus of over 1,500 MPa, is typically used to form these joints 20. However, higher rigidity normally tends to cause more transmission of vibration. High rigidity is therefore disadvantageous in terms of comfort due to lower ride quality or abnormal noise that is generated while driving a vehicle.

It is desired that the vehicle body 1, particularly a vehicle body portion that forms the passenger compartment 2 accommodating an occupant(s), not only have high rigidity but also be able to damp vibration that tends to cause discomfort to an occupant(s) (e.g., vibration of 50 to 60 Hz). However, since the loss factor of an adhesive having a storage modulus of over 1,500 MPa is generally about 0.05, such an adhesive does not have a vibration damping effect that is desired for the vehicle body 1.

While researching improvement in vibration damping characteristics of weld-bonded structures, the inventors found that the relation between the storage modulus of an adhesive that is used for weld bonding and the rigidity of weld bonding has unexpected universal characteristics.

Figure 4:
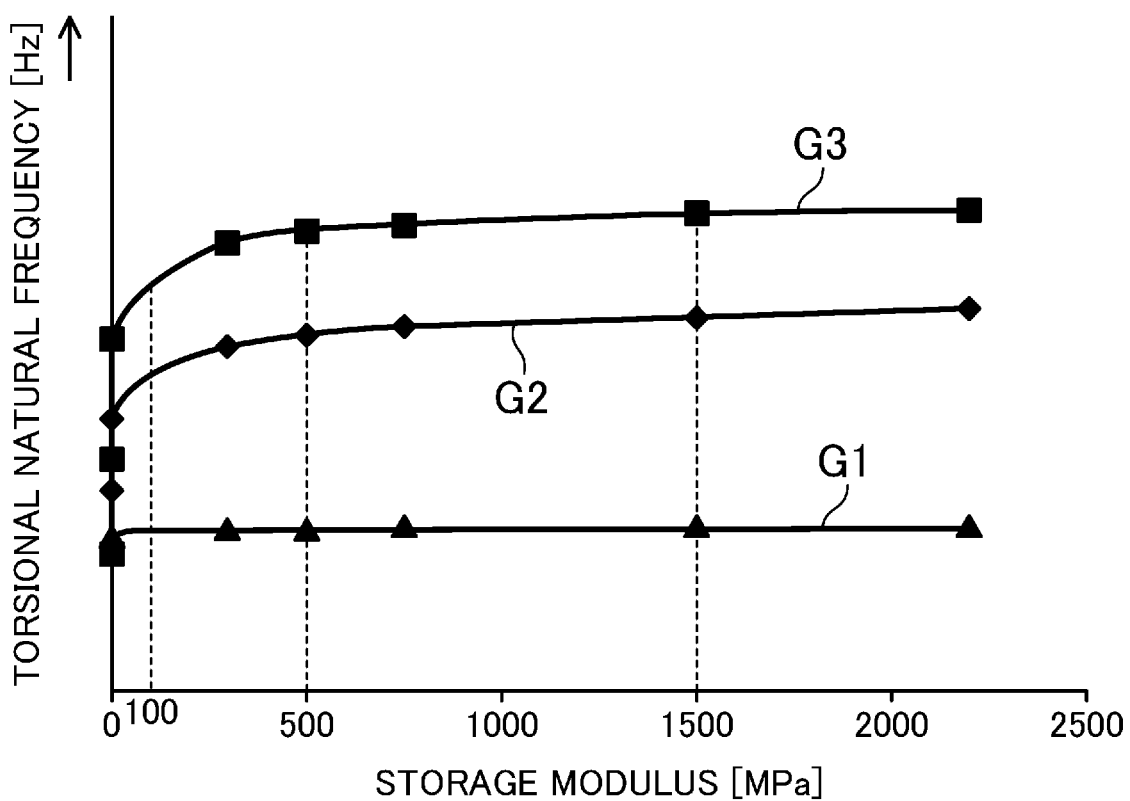
FIG. 4 is a graph showing the relations between the storage modulus of an adhesive used for weld bonding and the rigidity of weld bonding.

FIG. 4 shows the relations between the storage modulus of an adhesive used for weld bonding and the rigidity of weld bonding. These relations were obtained by computer aided engineering (CAE) analysis.

In FIG. 4, the abscissa represents the storage modulus and the ordinate represents the torsional natural frequency. The torsional natural frequency can be regarded as an index of rigidity. That is, the higher the torsional natural frequency is, the higher the rigidity is.

Each line in the graph of FIG. 4 represents the relation between the storage modulus of an adhesive used for weld bonding and the vehicle body rigidity in a vehicle body including the joints 20 formed by weld bonding. Specifically, line G1 shows the relation in the case where a small amount of adhesive was used for each joint 20 in a predetermined vehicle body, and line G2 shows the relation in the case where a large amount of adhesive was used for each joint 20 in the same vehicle body as line G1. Line G3 shows the relation in the case where a vehicle body is different from lines G1, G2 and the number of joints 20 and arrangement of the joints 20 are also different from lines G1, G2.

It is conventionally considered that the higher the storage modulus is, the higher the rigidity of welding bonding is. However, the result of FIG. 4 shows that, when the storage modulus becomes higher than 100 MPa, the rate of increase in rigidity of the vehicle body sharply decreases, and after this sharp decrease in the rate of increase in rigidity, the rigidity increases only slightly even if the storage modulus increases significantly.

As shown by lines G1 to G3, a similar tendency is seen for different vehicle body structures and different amounts of adhesive. This shows that such characteristics are universal. Although not shown in the figure, similar relations were obtained not only for vehicle bodies having a complex structure but also for simple models formed by a single cross member.

The above result shows that the relation between the storage modulus of an adhesive that is used for weld bonding and the rigidity of weld bonding has universal characteristics that are not affected by the structure of an object for which weld bonding is used.

Looking at such characteristics, the rigidity decreases by only about 20% even if the storage modulus of an adhesive is reduced from about 2,000 MPa, which is a conventional storage modulus, to 100 MPa. That is, the storage modulus can be significantly reduced while restraining reduction in rigidity. The rigidity is about the same at a storage modulus of over 500 MPa. The storage modulus can therefore be significantly reduced while providing conventional rigidity.

The loss factor can be increased by reducing the storage modulus. For example, when the storage modulus is 500 MPa, the loss factor can be 0.4 or more. Excellent vibration damping characteristics are therefore achieved.

Based on this knowledge, an adhesive having specific physical properties is used for the joints 20 of the vehicle body 1. Specifically, an adhesive having a storage modulus in the range of 100 MPa to 800 MPa and a loss factor of 0.2 or more at a temperature of 20° C. and an exciting force frequency of 60 Hz is used for the joints 20 of the vehicle body 1.

The temperature of 20° C. is an ordinary temperature and is a standard temperature condition for specifying physical properties of adhesives. The 60 Hz exciting force corresponds to vibration that tends to cause discomfort to an occupant(s). Comfort in vehicles (noise, vibration, and harshness (NVH)) can be improved by realizing excellent vibration damping characteristics under these conditions.

By using an adhesive having a storage modulus in the range of 100 MPa to 800 MPa and a loss factor of 0.2 or more for weld bonding under the above conditions, both high rigidity and excellent vibration damping characteristics can be achieved for the vehicle body 1 due to the characteristics described above. Improved ride quality and reduced noise are achieved while providing sufficient vehicle body strength.

Based on the characteristics shown in FIG. 4, the storage modulus is preferably in the range of 300 MPa to 700 MPa, more preferably in the range of 450 MPa to 600 MPa, and even more preferably higher than 500 MPa and 600 MPa or less.

The loss factor is preferably 0.3 or more rather than 0.2 or more, and more preferably 0.4 or more. The higher the loss factor is, the more the vibration damping effect is enhanced, which provides further improved comfort.

Such joints 20 usually have a narrow elongated shape. Accordingly, in order to stably achieve both high rigidity and excellent vibration damping characteristics, it is preferable that the entire joints 20 have a uniform joint state.

Each of the joints 20 such as the lap joint 20a and the butt joints 20b is therefore formed such that the adhesive joint 22 is continuous in the direction in which the joint 20 extends. That is, the adhesive joint 22 is not formed in only a part of the joint 20 in the direction in which the joint 20 extends, such as in only a part of each region between adjacent ones of the spot joints 21 or in only regions surrounding each spot joint 21, but is formed so as to be substantially continuous in the direction in which the joint 20 extends.

This allows an adhesive force to be uniformly applied to a large area of the joint 20 even though the joint 20 is formed by merely joining narrow regions. Accordingly, even if an external force is locally applied to the joint 20, the external force is smoothly spread over the entire joint 20. Rigidity of the vehicle body 1 is thus increased.

In order to stably achieve both high rigidity and excellent vibration damping characteristics of the vehicle body 1, as shown in FIGS. 2 and 3, the interval P between the spot joints 21 is preferably in the range of 10 mm to 100 mm, more preferably in the range of 15 mm to 70 mm, and even more preferably in the range of 25 mm to 50 mm.

A too short interval P between the spot joints 21 increases the influence of joint rigidity and thus interferes with the vibration damping effect of the adhesive joint 22. A too wide interval P between the spot joints 21 reduces the influence of joint rigidity and thus increases a burden on the adhesive joint 22, whereby the overall rigidity of the joint 20 may be reduced.

However, in the case where the interval P between the spot joints 21 is in the above range, the adhesive joint 22 having rigidity and vibration damping characteristics and the spot joints 21 having high rigidity appropriately complement each other, whereby both high rigidity and excellent vibration damping characteristics of the vehicle body 1 are stably achieved.

Secondary Effects

The use of an adhesive having the above specific physical properties for weld bonding increases structural rigidity of the vehicle body 1.

Figure 5A:
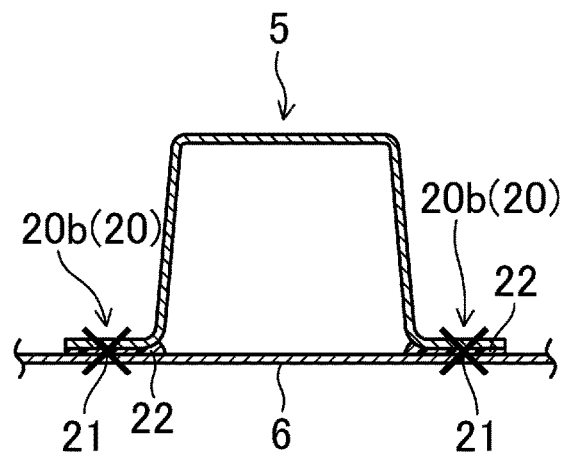
FIGS. 5A and 5B schematically show longitudinal sections of a cross member, where
Figure 6A:
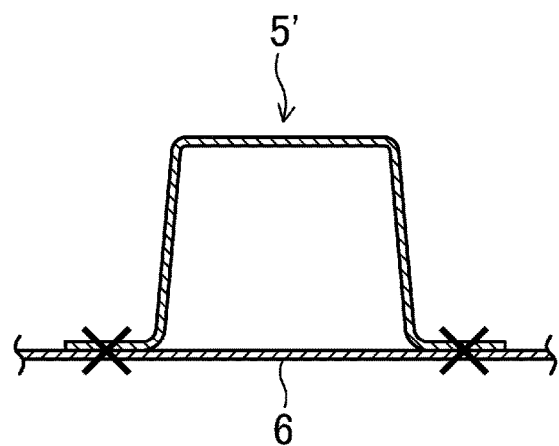
FIGS. 6A and 6B show a comparative example of FIG. 5, where

FIG. 5A schematically shows a longitudinal section of the cross member 5. FIG. 6A shows, as a comparative example, a cross member 5' joined only by spot welding. A torsional force is applied to these cross members 5, 5'.

Figure 6B:
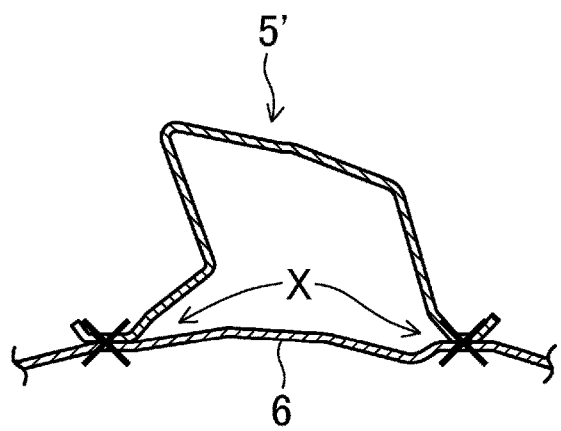

As shown in FIG. 6B, in the cross member 5' joined only by spot welding, the bonding force does not act on the edges of the joints which face toward the inside of a closed-section structure. Accordingly, the edges of the joints are opened due to the torsion and the cross member 5' is deformed, as shown by arrow X in FIG. 6B.

Figure 5B:
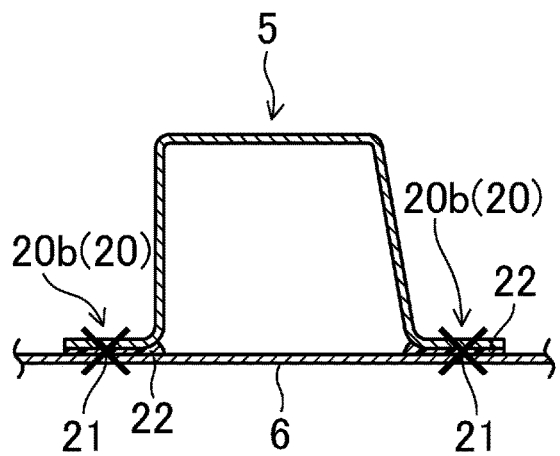

As shown in FIG. 5B, however, in the cross member 5, the bonding force of the adhesive joints 22 extending continuously in the direction in which the butt joint 20b extends restrains such opening of the edges of the butt joints 20b which face toward the inside of the closed-section structure, which reduces or eliminates the possibility of significant deformation of the cross member 5. The cross member 5 therefore has higher torsional rigidity than the comparative example.

Since an adhesive having a lower storage modulus and a higher loss factor than conventional adhesives is used for the butt joints 20b of the cross member 5, tolerance to deformation of the joints 20 is increased as compared to conventional examples. This allows the bonding force to act more effectively (30% or more improvement in torsional rigidity was seen in test pieces over the comparative example).

Figure 7A:
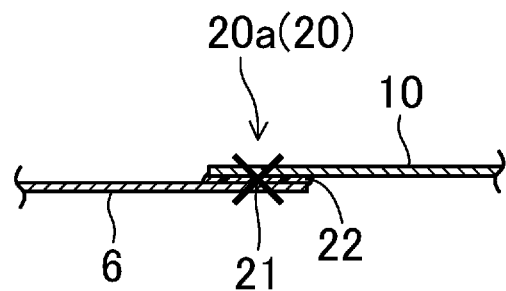
FIGS. 7A and 7B schematically show longitudinal sections of a joint between panels, where
Figure 8A:
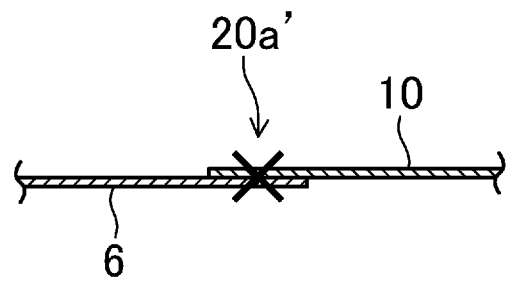
FIGS. 8A and 8B show a comparative example of FIG. 7, where

The same applies to the joint 20 between the floor panel 6 and the front panel member 10 etc. (lap joint 20a) which has an open-section structure. FIG. 7A schematically shows a longitudinal section of the lap joint 20a. FIG. 8A shows, as a comparative example, a lap joint 20a' formed only by spot welding. A torsional force is applied to these lap joints 20a, 20a' and their peripheral portions.

Figure 8B:
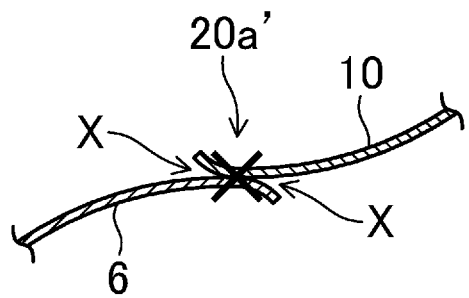

As shown in FIG. 8B, in the lap joint 20a' formed only by spot welding, the bonding force does not act on either edge of the lap joint 20a'. Accordingly, both edges of the lap joint 20a' are opened due to the torsion and the lap joint 20a' and its peripheral portion are deformed, as shown by arrow X in FIG. 8B.

Figure 7B:
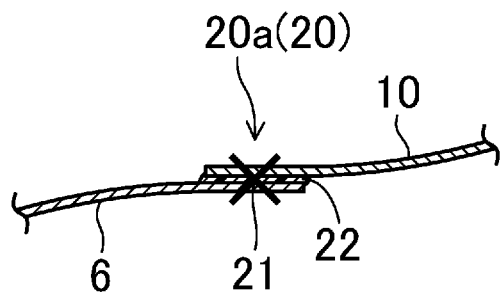

As shown in FIG. 7B, however, in the lap joint 20a between the floor panel 6 and the front panel member 10 etc., the bonding force of the adhesive joint 22 extending continuously in the direction in which the lap joint 20a extends restrains such opening of the edges of the lap joint 20a, which reduces or eliminates the possibility of significant deformation of the lap joint 20a and its peripheral portion.

In order to restrain such opening and reduce or eliminate the possibility of deformation of the joint 20 and its peripheral portion, it is preferable, in the case of a closed-section structure, to form the adhesive joint 22 at least along the edge of the butt joint 20b which faces toward the inside of the closed-section structure. In the case of an open-section structure, it is preferable to form the adhesive joint 22 at least along at least one of the edges of the lap joint 20a, and more preferably at least along both of the edges of the lap joint 20a.

Figure 9A:
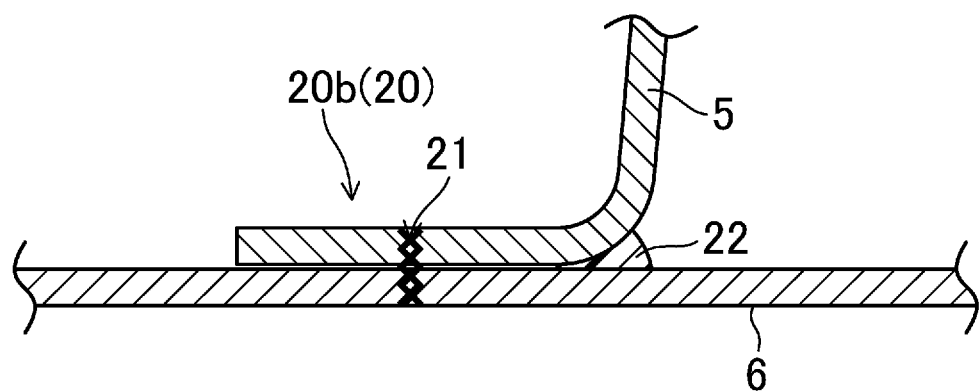
FIG. 9A schematically shows a modification of an adhesive bond (butt joint).
Figure 9B:
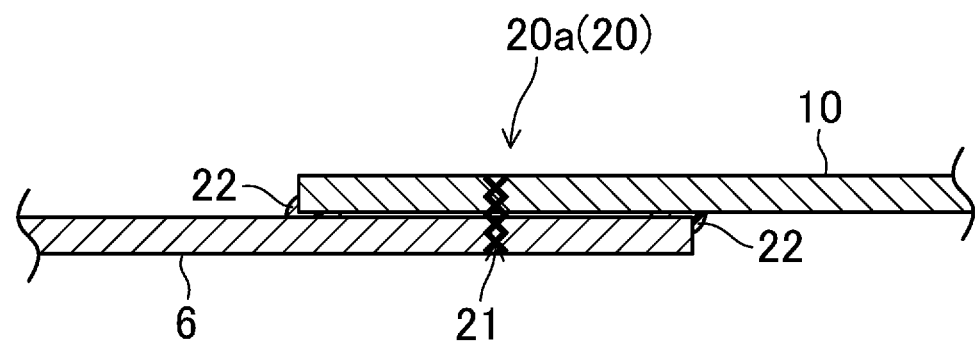
FIG. 9B schematically shows a modification of an adhesive bond (lap joint).

Specifically, as shown in FIGS. 9A and 9B, the adhesive joint 22 may not be formed in a large area of the joint 20, but may be formed only in a portion along the edge of the butt joint 20b which faces toward the inside of the closed-section structure or may be formed only in a portion along at least one of the edges of the lap joint 20a, and preferably only in portions along both of the edges of the lap joint 20a. The amount of adhesive to be used is thus reduced, and opening of the edges of the joints is efficiently restrained.

In this case, it is more preferable that a part of the adhesive joint 22 stick out from the edge of the butt joint 20b or from one or both of the edges of the lap joint 20a depending on whether the adhesive joint 22 is formed along one of the edges of the lap joint 20a or both of the edges of the lap joint 20a. This allows the adhesive joint 22 to be stably formed along the edge of the butt joint 20b or along one or both of the edges of the lap joint 20a even if the amount of adhesive that is applied or the position where the adhesive is applied varies to a certain extent. Opening of the edges of the joints is therefore more accurately restrained. This configuration is also effective in the case where the adhesive joint 22 is formed in substantially the entire joint 20.

In particular, such a joint 20 is effective in bonding a thin body part.

Specifically, such a joint 20 is effective in the case where at least one of two body parts forming the joint 20 has a thickness of less than 2 mm. If both of the body parts forming the joint 20 have a thickness of 2 mm or more, rigidity of the body parts is too high relative to rigidity of the adhesive in the case where an external force such as a torsional force is applied to the joint 20. The body parts are therefore less likely to be deflected as appropriate according to the rigidity of the adhesive, and the aforementioned improvement in vibration damping characteristics is not achieved.

On the other hand, if at least one of the two body parts forming the joint 20 has a thickness of less than 2 mm, at least the body part having a thickness of less than 2 mm out of the two body parts is deflected as appropriate according to the rigidity of the adhesive. The adhesive placed in the joint 20 is therefore subjected to load such as a shear force, and the aforementioned improvement in vibration damping characteristics is achieved. The thinner the body parts are, the higher the expected rate of improvement in vibration damping characteristics is. The use of the body parts having a smaller thickness is also more advantageous in terms of reduction in cost of members and reduction in vehicle body weight.

The disclosed technique is not limited to the above embodiment and includes various other configurations. For example, the adhesive joint 22 may not necessarily be formed along the edge or edges of the joint 20. If it is not preferable that the adhesive joint 22 stick out from the edge or edges of the joint 20 in an aesthetic point of view etc., the adhesive joint 22 may be formed at a position or positions located inside the edge or edges of the joint.

The portion where the joint 20 is formed is not limited to the portion where the cross member 5 or the floor panel 6 is to be joined. The joint 20 may be formed anywhere as long as weld bonding can be performed. The spot joint is not limited to spot welding. The spot joint may have any dot-like joint structure. For example, the spot joint may have a mechanical joint structure obtained by bolt-nut tightening, clinching, riveting, self-piercing riveting (SPR), etc.

What is claimed is:

1. A vehicle body structure of a vehicle which includes a joint formed by joining a body part and another body part such that the body parts overlap each other, wherein
   the joint includes a plurality of spot joints located at intervals in a direction in which the joint extends and formed by partially joining the body parts, and an adhesive joint formed by adhesion of an adhesive placed between the body parts to both of the body parts, and
   the adhesive has a storage modulus in the range of 100 MPa to 800 MPa and a loss factor of 0.2 or more at a temperature of 20° C. and an exciting force frequency of 60 Hz.

2. The vehicle body structure according to claim 1, wherein
   the adhesive has a storage modulus of higher than 500 MPa and 600 MPa or less and a loss factor of 0.3 or more at a temperature of 20° C. and an exciting force frequency of 60 Hz.

3. The vehicle body structure according to claim 1, wherein
   the adhesive joint is continuous in the direction in which the joint extends.

4. The vehicle body structure according to claim 3, wherein
   the interval between the spot joints is in the range of 10 mm to 100 mm.

5. The vehicle body structure according to claim 2, wherein
   the adhesive joint is continuous in the direction in which the joint extends.

6. The vehicle body structure according to claim 5, wherein
   the interval between the spot joints is in the range of 10 mm to 100 mm.

7. The vehicle body structure according to claim 1, wherein
   the joint includes a pair of butt joints located so as to face each other at a predetermined interval, and
   a closed-section structure is formed between the pair of butt joints.

8. The vehicle body structure according to claim 6, wherein
   the joint includes a pair of butt joints located so as to face each other at a predetermined interval, and
   a closed-section structure is formed between the pair of butt joints.

9. The vehicle body structure according to claim 7, wherein
   the adhesive joint is formed along an edge of the butt joint which faces toward inside of the closed-section structure.

10. The vehicle body structure according to claim 8, wherein
    the adhesive joint is formed along an edge of the butt joint which faces toward inside of the closed-section structure.

11. The vehicle body structure according to claim 1, wherein
    the joint includes a lap joint formed by joining ends of the body parts.

12. The vehicle body structure according to claim 10, wherein
    the joint includes a lap joint formed by joining ends of the body parts.

13. The vehicle body structure according to claim 11, wherein
    the adhesive joint is formed along at least one of edges of the lap joint.

14. The vehicle body structure according to claim 12, wherein
    the adhesive joint is formed along at least one of edges of the lap joint.

15. The vehicle body structure according to claim 9, wherein
    at least one of the two body parts forming the joint has a thickness of less than 2 mm.

16. The vehicle body structure according to claim 10, wherein
    at least one of the two body parts forming the joint has a thickness of less than 2 mm.

17. The vehicle body structure according to claim 13, wherein
    at least one of the two body parts forming the joint has a thickness of less than 2 mm.

18. The vehicle body structure according to claim 14, wherein
    at least one of the two body parts forming the joint has a thickness of less than 2 mm.

19. The vehicle body structure according to claim 1, wherein the joint is used to join the body parts that form a passenger compartment of the vehicle.

20. The vehicle body structure according to claim 18, wherein
the joint is used to join the body parts that form a passenger compartment of the vehicle.

\* \* \* \* \*